United States Patent
Phillips

(10) Patent No.: US 8,579,755 B2
(45) Date of Patent: Nov. 12, 2013

(54) PASSIVE MECHANICAL TORQUE CONVERTER

(75) Inventor: Andrew W. Phillips, Rochester, MI (US)

(73) Assignee: GM Global Technology Operations LLC, Detroit, MI (US)

(*) Notice: Subject to any disclaimer, the term of this patent is extended or adjusted under 35 U.S.C. 154(b) by 309 days.

(21) Appl. No.: 13/041,727

(22) Filed: Mar. 7, 2011

(65) Prior Publication Data
US 2012/0231921 A1 Sep. 13, 2012

(51) Int. Cl.
*F16H 3/44* (2006.01)

(52) U.S. Cl.
USPC .......... 475/293; 475/324; 192/105 C

(58) Field of Classification Search
USPC ........... 192/48.1, 48.7, 48.8, 105 C, 103 R; 475/323–328, 293
See application file for complete search history.

(56) References Cited

U.S. PATENT DOCUMENTS

| | | | | |
|---|---|---|---|---|
| 1,909,191 A * | 5/1933 | Stafford | .......... | 475/262 |
| 3,540,308 A * | 11/1970 | Preston | .......... | 475/268 |
| 5,284,234 A * | 2/1994 | Miglizzi | .......... | 192/105 C |
| 5,628,703 A * | 5/1997 | Roeper | .......... | 475/159 |
| 5,733,217 A * | 3/1998 | Naraki et al. | .......... | 475/258 |
| 5,846,153 A * | 12/1998 | Matsuoka | .......... | 475/269 |
| 6,849,024 B2 * | 2/2005 | Hayashi et al. | .......... | 475/312 |
| 7,204,781 B2 * | 4/2007 | Hiraku et al. | .......... | 475/312 |
| 7,377,873 B2 * | 5/2008 | Shim et al. | .......... | 475/284 |
| 2003/0104900 A1 * | 6/2003 | Takahashi et al. | .......... | 477/3 |
| 2007/0037659 A1 * | 2/2007 | Bailey et al. | .......... | 475/296 |

* cited by examiner

*Primary Examiner* — Justin Holmes
*Assistant Examiner* — Huan Le

(57) ABSTRACT

A passive mechanical torque converter includes an input member which is coupled to an input of a first centripetal clutch. The output of the first centripetal clutch is coupled to both one element of a planetary gear assembly and the input of a second, double sided centripetal clutch. Another element of the planetary gear assembly is coupled to one side of a one way (overrunning) clutch, the other side of which is grounded. The output of the double sided centripetal clutch and the third element of the planetary gear assembly are coupled to an output member.

20 Claims, 2 Drawing Sheets

PASSIVE MECHANICAL TORQUE CONVERTER

FIELD

The present disclosure relates to a torque converter for a motor vehicle powertrain and more particularly to a passive mechanical torque converter for a motor vehicle powertrain having two centripetal clutches, a planetary gear assembly and a one way clutch.

BACKGROUND

The statements in this section merely provide background information related to the present disclosure and may or may not constitute prior art.

Many modern automatic transmission configurations for passenger cars and light trucks include a plurality of planetary gear assemblies arranged in tandem. Various fixed members as well as selectively engageable clutches and brakes connect elements of the planetary gear assemblies to provide a sequence of gear ratios or speeds.

An integral part of these automatic transmission configurations is a torque converter, a fluid filled device that not only multiplies engine torque but also acts as a fluid coupling between the engine and transmission which disconnects the engine output from the transmission input at engine idle.

While the disconnection provided by a torque converter is a necessity, there have long been raised questions about the efficiency and cost of this device, primarily relating to the nature of the coupling between the engine output and the transmission input the torque converter provides. One improvement, adopted many years ago is the lock-up torque converter. In this device, when the torque converter (and entire powertrain) reaches a certain speed, the input and the output of the torque converter are locked together, thereby eliminating any fluid (frictional) losses between the input and the output of the torque converter. Nonetheless, this device still represents a significantly complex and expensive powertrain component and efforts to improve the selective torque coupling between the engine output and the transmission input continue.

The present invention is so directed.

SUMMARY

The present invention provides a passive mechanical torque converter that replaces a conventional fluid filled torque converter and provides both improved performance and reduced complexity. The torque converter of the present invention includes an input member which is driven by a prime mover and is coupled to an input of a first centripetal clutch. The output of the first centripetal clutch is coupled to both one element of a planetary gear assembly and the input of a second, double sided centripetal clutch. Another element of the planetary gear assembly is coupled to one side of a one way (overrunning) clutch, the other side of which is grounded to, for example, a transmission housing. The output of the second, double sided centripetal clutch and the third element of the planetary gear assembly are coupled to an output member.

Thus it is an aspect of the present invention to provide a passive mechanical torque converter.

It is a further aspect of the present invention to provide a passive mechanical torque converter having two centripetal clutches.

It is a still further aspect of the present invention to provide a passive mechanical torque converter having two centripetal clutches and a planetary gear assembly.

It is a still further aspect of the present invention to provide a passive mechanical torque converter having two centripetal clutches and a one way clutch.

It is a still further aspect of the present invention to provide a passive mechanical torque converter having two centripetal clutches, a planetary gear assembly and a one way clutch.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
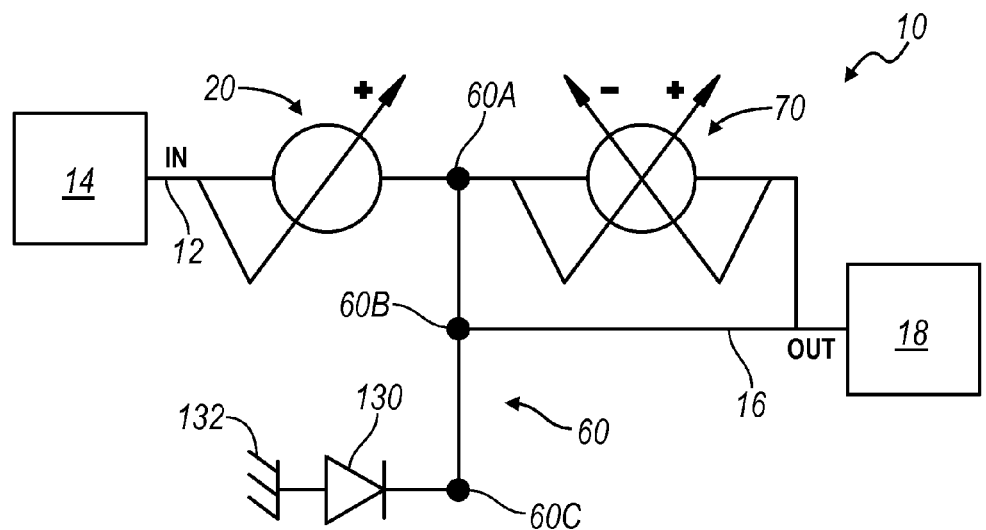
FIG. 1 is a schematic drawing of a passive mechanical torque converter according to the present invention.

With reference to FIG. 1, a schematic (lever) diagram of a passive mechanical torque converter according to the present invention is presented and the device is generally designated by the reference number 10. The passive mechanical torque converter 10 includes an input member 12 which is preferably and typically coupled to and driven by a prime mover 14. The input member 12 is coupled to and drives an input of a first centripetal friction clutch assembly 20. An output of the first centripetal clutch assembly 20 is coupled to and drives a first element or node 60A of a planetary gear assembly 60. The first element of node 60A of the first planetary gear assembly 60 is also coupled to an input of a second, double sided centripetal friction clutch assembly 70. The output of the second, double sided centripetal friction clutch assembly 70 is coupled to a second element or node 60B of the planetary gear assembly 60 and drives an output member 16 which is coupled to and drives an automatic transmission 18. The third element or node 60C of the planetary gear assembly 60 is connected to one side of a one way or overrunning clutch 130. The other side of the one way or overrunning clutch 130 is coupled to ground which may be a housing such as a bell housing 132 of the automatic transmission 18.

Figure 2:
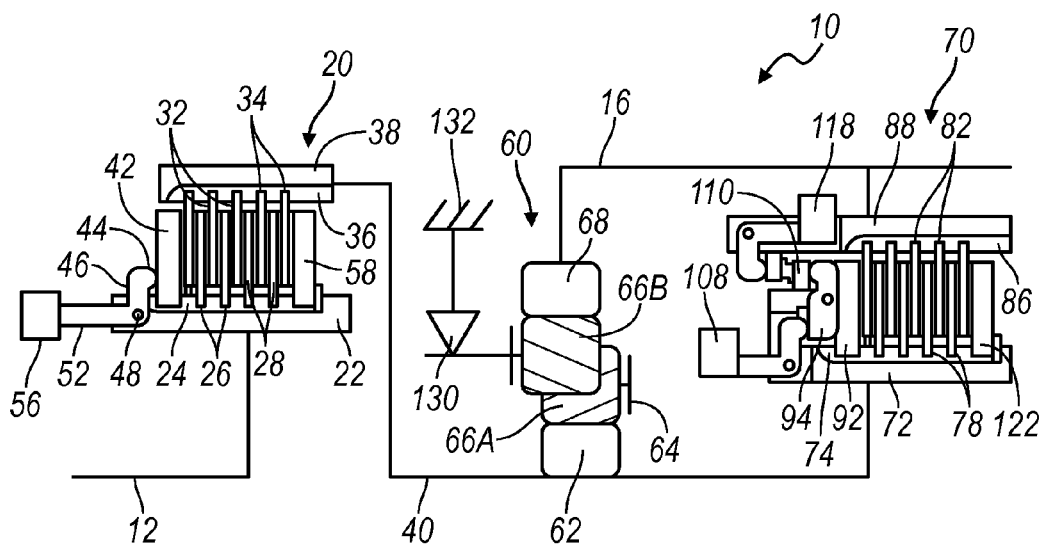
FIG. 2 is a half sectional view of a passive mechanical torque converter according to the present invention.

Referring now to FIG. 2, the passive mechanical torque converter 10 of the present invention includes an input shaft or member 12 which is connected to a first input hub 22 of the first centripetal friction clutch assembly 20 having a plurality of male splines 24 that engage a plurality of complementary female splines 26 on a first plurality of friction clutch plates or discs 28. A second plurality of friction plates or discs 32 are interleaved with the first plurality of friction plates or discs 28 and include a plurality of male splines 34 about their peripheries that engage a plurality of female splines 36 in a first output hub 38. The first output hub 38 is coupled to or integrally formed with a shaft, quill or rotating member 40.

At one end of the interleaved pluralities of friction clutch plates or discs 28 and 32 is disposed an apply plate 42. The apply plate 42 is acted upon by one end 44 of a lever arm 46 that is disposed on a pivot pin 48. The other end of the lever arm 52 is disposed generally parallel to the axis of rotation of the passive mechanical torque converter 10 (and the input shaft or member 12) and terminates in a mass or weight 56. It should be appreciated that other axial force generating operators such as balls, rollers or other similar masses engaging one or a pair of ramps or oblique surfaces may be utilized in the first centripetal friction clutch assembly 20. It should also be appreciated that the first input hub 22 and the first output hub 38 are annuli and that the friction clutch plates or discs 28 and 32 and the apply plate 42 are circular and that while a single lever arm 46, one pivot pin 48 and one mass or weight 56 are illustrated in FIG. 2, it should be understood that several, i.e., three, four, six or more, for example, of these assemblies are mounted about the first input hub 22 at equally spaced circumferential intervals, for example, 120°, 90° or 60°. At the opposite end of the interleaved pluralities of friction clutch plates or discs 28 and 32 is disposed a stop or reaction plate 58.

The planetary gear assembly 60 is preferably a compound planetary gear assembly and includes a sun gear 62 which is coupled to the shaft, quill or rotating member 40 which, in turn, is coupled to the first output hub 38. The planetary gear assembly 60 includes a planet gear carrier 64 which freely rotatably supports a first plurality of planet gears 66A (one of which is illustrated in FIG. 2) which are in constant mesh with the sun gear 62 and a second plurality of planet gears 66B (one of which is illustrated in FIG. 2). The second plurality of planet gears 66B are, in turn, in constant mesh with a ring gear 68. The ring gear 68 is coupled to and drives the output shaft 16. It should be understood that the ratios provided by the gears 62, 66A, 66B and 68 may be adjusted over a broad range to suit specific applications and that a simple planetary gear assembly having a single set of planetary gears rather than the compound assembly described may also be utilized in, and forms a portion of, the present invention. Finally, it should be understood that different connection arrangements of the sun gear 62, the planet gear carrier 64 and the ring gear 68 to the other components of the passive mechanical torque converter 10 are possible, readily undertaken and thus form a portion of the present invention.

Figure 3:
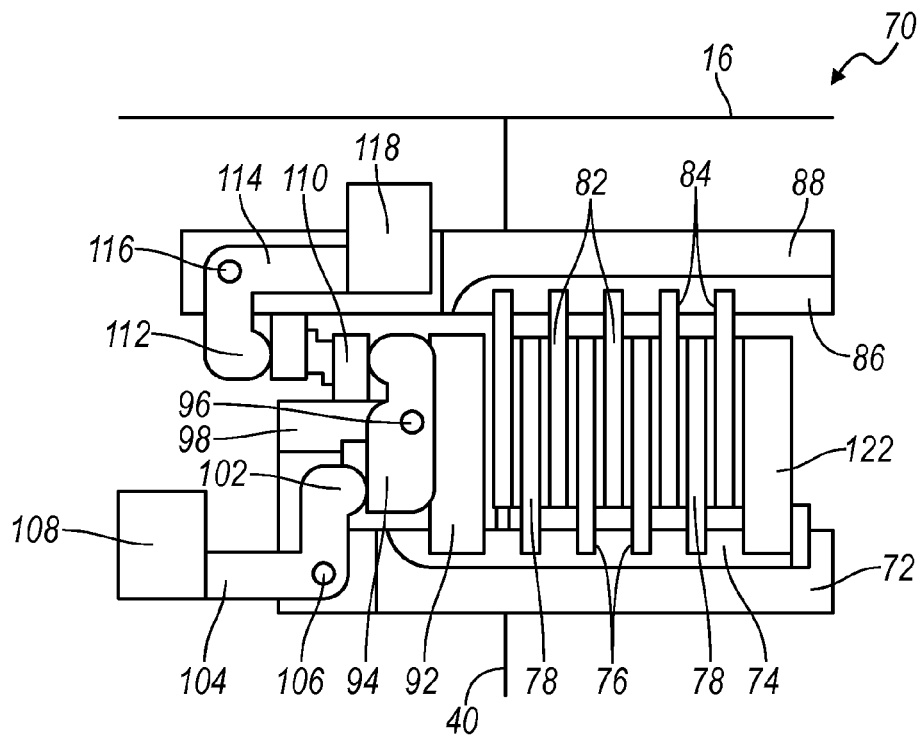
FIG. 3 is an enlarged, sectional view of a double sided clutch of a passive mechanical torque converter according to the present invention.

Referring now to FIGS. 2 and 3, the shaft, quill or rotating member 40 is also coupled to a second input hub 72 of the second, double sided centripetal friction clutch assembly 70. The second input hub 72 includes a plurality of male splines 74 that engage a plurality of complementary female splines 76 on a first plurality of friction clutch plates or discs 78. A second plurality of friction plates or discs 82 are interleaved with the first plurality of friction plates or discs 78 and include a plurality of male splines 84 about their peripheries that engage a plurality of female splines 86 in a second output hub 88. The second output hub 88 is coupled to or integrally formed with the out put shaft or member 16.

At one end of the interleaved pluralities of friction clutch plates or discs 78 and 82 is disposed a second apply plate 92. The second apply plate 92 is acted upon by a pivoted rocker arm or member 94 having a pivot pin 96 disposed at its radial midpoint and secured to a web or extension 98 of the second input hub 72. The pivoted rocker member 94 is, in turn, acted upon at an inner end by one end 102 of a first lever arm 104 that is disposed on a pivot pin 106 secured to the second input hub 72. The other end of the first lever arm 104 is disposed generally parallel to the axis of rotation of the passive mechanical torque converter 10 (and the shaft, quill or rotating member 40) and terminates in a mass or weight 108. The pivoted rocker member 94 is acted upon at an outer end through a thrust bearing 110 by one end 112 of a second lever arm 114 that is disposed on a pivot pin 116 secured to the second output hub 88. The other end of the second lever arm 114 is disposed generally parallel to the axis of rotation of the passive mechanical torque converter 10 (and the shaft, quill or rotating member 40) and terminates in a mass or weight 118. It should be appreciated that other axial force generating operators such as balls, rollers or other similar masses engaging one or a pair of ramps or oblique surfaces may be utilized in the second, double sided centripetal friction clutch assembly 70.

It should also be appreciated that the second input hub 72 and the second output hub 88 are annuli and that the friction clutch plates or discs 78 and 82 and the second apply plate 92 are circular and that while only one pivoted rocker member 94, one first lever arm 104, one pivot pin 106 and one mass or weight 108 and one second lever arm 114, one pivot pin 116 and one mass or weight 118 are illustrated in FIGS. 2 and 3, it should be understood that several, i.e., three, four, six or more, for example, of these assemblies are mounted about the second input hub 72 and the second output hub 88 at equally spaced circumferential intervals, for example, 120°, 90° or 60°. At the opposite end of the interleaved pluralities of friction clutch plates or discs 78 and 82 is disposed a stop or reaction plate 122.

One side (an input) of the one way or overrunning clutch 130 is coupled to the planet gear carrier 64 and the other side (an output) of the one way or overrunning clutch 130 is coupled to ground or a stationary housing such as the bell housing 132 of the automatic transmission 18. The one way or overrunning clutch 130 is configured and disposed to allow rotation of the planet gear carrier 64 in the same absolute direction as the input shaft 12 and the shaft, quill or rotating member 40 and resist and inhibit rotation of the planet gear carrier 64 in a direction opposite to the rotation of the input shaft 12 and the shaft, quill or rotating member 40. The one way or overrunning clutch 130 may be any conventional type of one way or overrunning clutch such as a sprag or ball bearing clutch having suitable torque carrying capacity.

Figure 4:
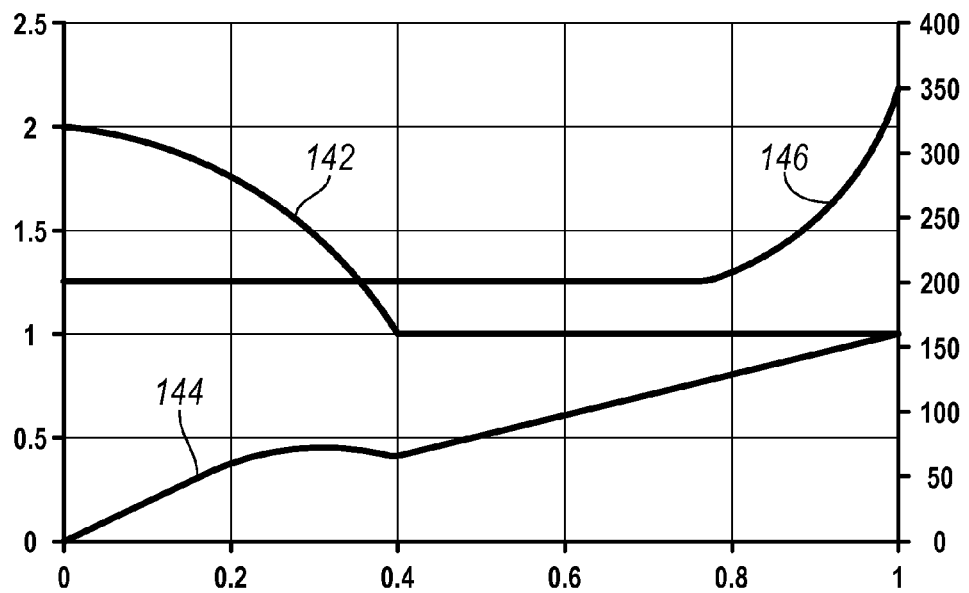
FIG. 4 is a graph presenting torque ratio, efficiency and the K—factor versus speed ratio of a passive mechanical torque converter according to the present invention.

Referring now to FIGS. 2 and 4, operation of the passive mechanical torque converter 10 will be described. The left side vertical (Y) axis presents torque ratio efficiency values and relates to lines 142 and 144. The right side vertical (Y) axis presents input K—factor values and relates to a line 146. The horizontal (X) axis presents input to output speed ratio values and relates to the three lines 142, 144 and 146. At stall represented by the left side of the graph of FIG. 4, neither side of the double sided centripetal clutch assembly 70 is rotating so it has no torque transfer capability. All the torque of the first centripetal friction clutch assembly 20 is carried through the planetary gear assembly 60 which provides torque multiplication. The line 142 represents the torque ratio which begins at 2.0, the stall torque ratio, which is the ratio provided by the planetary gear assembly 60 at stall, which eventually drops to 1.0 (unity).

As the speed of the output shaft 16 increases, up to approximately a speed ratio which is the inverse of the stall torque ratio, the input speed of the second, double sided centripetal clutch assembly 70 is faster than the output speed and this speed differential unbalances the rocker member 94 which compresses the friction plates or discs 78 and 82 and begins to transfer torque. This action begins to split the input torque between the torque multiplying path through the planetary gear assembly 60 and a direct path through the second, double sided centripetal clutch assembly 70, reducing the torque multiplying effect of the planetary gear assembly 60. Eventually, as the rotational speed of the components increases, the difference between the input speed and the output speed decreases and the operating point moves across FIG. 4 from left to right, all torque is transmitted through both centripetal clutches 20 and 70.

As the speed ratio approaches unity, the second, double sided centripetal clutch assembly 70 (unlike the first centripetal clutch 20) has lower and lower torque transfer capability, so that near lockup most or all of the torque transfer through it has ceased. This gives a smooth lockup action similar to a fluid coupling. Line 144 represents the efficiency of the passive mechanical torque converter 10 which, of course, begins at zero on the left side of FIG. 4. The line 146 represents the input K—factor which is constant during the initial stages of operation and then rises significantly when the input to output speed ratio passes approximately 0.8.

The description of the invention is merely exemplary in nature and variations that do not depart from the gist of the invention are intended to be within the scope of the invention. Such variations are not to be regarded as a departure from the spirit and scope of the invention.

What is claimed is:

1. A torque converter for a motor vehicle powertrain comprising, in combination,
   an input member,
   a centripetal clutch having first and second pluralities of interleaved plates, said input member connected to said first plurality of plates,
   a planetary gear assembly having a first, a second and a third element,
   a double sided centripetal clutch having first and second pluralities of interleaved plates,
   said second plurality of plates of said centripetal clutch connected to one of said elements of said planetary gear assembly and to said first plurality of plates of said double sided centripetal clutch,
   a one way clutch connected between another of said elements of said planetary gear assembly and ground, and
   an output member connected to yet another of said elements of said planetary gear assembly and said second plurality of plates of said double sided centripetal clutch.

2. The torque converter of claim 1 wherein said ground is a transmission housing.

3. The torque converter of claim 1 wherein said centripetal clutch includes at least one weight disposed on a pivoted arm, said pivoted arm having an end opposite said weight acting on said first and second pluralities of interleaved plates.

4. The torque converter of claim 1 wherein said double sided centripetal clutch includes at least a pair of weights each disposed on a respective pair of pivoted arms and at least one rocker lever adjacent said first and second pluralities of interleaved plates having a pair of ends and a center pivot, one of said pivoted arms operably engaging one of said pair of ends of said rocker lever and another of said pivoted arms operably engaging another of said pair of ends of said rocker lever.

5. The torque converter of claim 1 wherein said output member drives an automatic transmission.

6. The torque converter of claim 1 wherein said input member is coupled to and driven by an output member of a prime mover.

7. The torque converter of claim 1 wherein said planetary gear assembly includes a sun gear, a planet gear carrier including a plurality of planet gears and a ring gear, wherein said plurality of planet gears are in constant mesh with said sun gear and said ring gear.

8. A passive mechanical torque converter comprising, in combination,
   an input member,
   a first centripetal clutch having first and second pluralities of interleaved plates, said input member connected to said first plurality of plates of said first centripetal clutch,
   a planetary gear assembly having a first, a second and a third element,
   a second centripetal clutch having first and second pluralities of interleaved plates,
   said second plurality of plates of said first centripetal clutch connected to one of said elements of said planetary gear assembly and to said first plurality of plates of said second centripetal clutch,
   a one way clutch connected between another of said elements of said planetary gear assembly and ground, and
   an output member connected to yet another of said elements of said planetary gear assembly and said second plurality of plates of said second centripetal clutch.

9. The passive mechanical torque converter of claim 8 wherein said first centripetal clutch includes at least one weight disposed on a pivoted arm, said pivoted arm having an end opposite said weight acting on said first and second pluralities of interleaved plates.

10. The passive mechanical torque converter of claim 8 wherein said second centripetal clutch includes at least a pair of weights each disposed on a respective pair of pivoted arms and at least one rocker lever adjacent said first and second pluralities of interleaved plates having a pair of ends and a center pivot, one of said pivoted arms operably engaging one of said pair of ends of said rocker lever and another of said pivoted arms operably engaging another of said pair of ends of said rocker lever.

11. The passive mechanical torque converter of claim 8 wherein said input member is coupled to and driven by an output member of a prime mover.

12. The passive mechanical torque converter of claim 8 wherein said output member drives an automatic transmission.

13. The passive mechanical torque converter of claim 8 wherein said planetary gear assembly includes a sun gear, a planet gear carrier including a plurality of planet gears and a ring gear, wherein said plurality of planet gears are in constant mesh with said sun gear and said ring gear.

14. The passive mechanical torque converter of claim 8 wherein said ground is a housing.

15. A mechanical torque converter comprising, in combination,
   a housing,
   an input member adapted to be driven by a prime mover,
   a first centripetal clutch having first and second pluralities of interleaved plates, said input member connected to said first plurality of plates of said first centripetal clutch,
   a planetary gear assembly having a first, a second and a third element,
   a second, double sided centripetal clutch having first and second pluralities of interleaved plates,
   said second plurality of plates of said first centripetal clutch connected to one of said elements of said planetary gear assembly and to said first plurality of plates of said second centripetal clutch,
   a one way clutch connected between another of said elements of said planetary gear assembly and said housing, and an output member connected to yet another of said elements of said planetary gear assembly and said second plurality of plates of said second centripetal clutch and adapted to drive an automatic transmission.

16. The mechanical torque converter of claim 15 wherein said first centripetal clutch includes at least one weight disposed on a pivoted arm, said pivoted arm having an end opposite said weight acting on said first and second pluralities of interleaved plates.

17. The mechanical torque converter of claim 15 wherein said second centripetal clutch includes at least a pair of weights each disposed on a respective pair of pivoted arms and at least one rocker lever adjacent said first and second pluralities of interleaved plates having a pair of ends and a center pivot, one of said pivoted arms operably engaging one of said pair of ends of said rocker lever and another of said pivoted arms operably engaging another of said pair of ends of said rocker lever.

18. The mechanical torque converter of claim 15 wherein said input and output members are shafts disposed on a common axis.

19. The mechanical torque converter of claim 15 wherein said first, second and third elements of said planetary gear assembly include a sun gear, a planet gear carrier including a plurality of planet gears and a ring gear.

20. The mechanical torque converter of claim 19 wherein said one way clutch is operably disposed between said planet gear carrier and said housing.

* * * * *